United States Patent [19]
Main et al.

[11] Patent Number: 5,316,436
[45] Date of Patent: May 31, 1994

[54] DEVICE FOR HOLDING AND INVERTING STEAM TURBINE CYLINDER HALVES

[75] Inventors: Michael A. Main, Winter Springs, Fla.; Jonathan C. Snyder, Brandon, Miss.

[73] Assignee: Westinghouse Electric Corp., Pittsburgh, Pa.

[21] Appl. No.: 823,415

[22] Filed: Jan. 21, 1992

[51] Int. Cl.$^5$ ............................................. B25J 11/00
[52] U.S. Cl. .................................. 414/778; 414/772; 414/784; 414/910; 414/786
[58] Field of Search ............... 414/678, 758, 768, 778, 414/784, 910, 772, 786

[56] References Cited

U.S. PATENT DOCUMENTS

| | | |
|---|---|---|
| 3,459,312 | 8/1969 | Koltookian .......................... 414/758 |
| 4,645,412 | 2/1987 | Schramm et al. ..................... 414/758 |
| 5,043,132 | 8/1991 | Fujita et al. ......................... 414/678 |
| 5,051,056 | 9/1991 | Gibbons et al. ...................... 414/678 |
| 5,085,557 | 2/1992 | Britcher, Jr. et al. ................ 414/778 |

Primary Examiner—Michael S. Huppert
Assistant Examiner—Gregory A. Morse
Attorney, Agent, or Firm—Michael G. Panian

[57] ABSTRACT

An apparatus and method for holding and inverting cylinder halves of steam turbines is disclosed. The device includes an adjustable base member having a temporary cylinder half support platform. The support includes a jacking mechanism for raising and lower the cylinder half when placed thereon. A rotatable carriage assembly is supported above the base member and securable to the cylinder half flange, the carriage being rotated by a rotation drive unit which is controlled to rotate the cylinder half at a constant rate. After a cylinder half is placed on a support platform, the jacks are activated to raise the cylinder half flange to the level of the rotatable carriage and the flange secured to the carriage. A support is then lowered and removed, and the cylinder half rotated about either its longitudinal or quadrature axis. The axis of rotation is chosen such that the center of gravity of the cylinder half passes therethrough. When maintenance is completed on the cylinder half, it is then removed from the vice by reversing the above steps. Base member is adjustable to accommodate steam turbine cylinder halves of varying dimensions.

6 Claims, 3 Drawing Sheets

DEVICE FOR HOLDING AND INVERTING STEAM TURBINE CYLINDER HALVES

TECHNICAL FIELD

The invention relates to inspection and maintenance of steam turbines, and more particularly to a method and apparatus for holding and inverting steam turbine cylinder halves.

BACKGROUND OF THE INVENTION

During the operating life of a steam turbine, periodic maintenance, inspection and repair of steam turbine components must be performed. For example, certain portions of steam turbines, particularly those employed in nuclear power plants, must operate under a high pressure environment. The carbon steel material used for steam turbines, while meeting selected other engineering requirements, generally is not highly erosion resistant. Another factor is inlet steam flow conditions, which generally involve a high volume of steam near the saturation point. During operation under high pressure environments, the steam flow path through the turbine may cause unpredictable thermal hydraulic characteristics, such as high velocity turbulent conditions, which may result in an erosion-corrosion effect on these carbon steel parts. This erosion-corrosion reaction over time can tend to decrease the wall thickness of the pressure containing members and produce a rough surface. The rough surface, in turn, can accelerate the effect of the erosion-corrosion reaction, further increasing the turbulence within the steam flow path.

Normally, during periodic maintenance inspections, the steam turbine top cylinder half is unbolted and removed to conduct inspections. The top cylinder half is secured to the bottom cylinder half, at a mating area consisting of corresponding flange elements, by a plurality of bolts. After these bolts are removed, the steam turbine top cylinder half is lifted and removed from the bottom half. For inspection to be performed on the steam turbine top cylinder half, the cylinder half is typically suspended by means of a large overhead crane. Furthermore, work must be performed on the top cylinder half while it is suspended over head, or the cylinder half is rotated using cables and hooks suspended and operated by the overhead crane. In either case, the overhead crane is required, in which case it is unavailable for other plant operations.

An example of repair operations that may be performed on a steam turbine cylinder half are described in U.S. Pat. No. 5,049,716, which issued on Sep. 17, 1991, assigned to the present assignee and incorporated herein by reference, which is entitled "Steam Turbine Having Applied Novel Erosion-Resistant Surfaces and Methods for Applying These Surfaces". By way of brief explanation, erosion-resistant surfaces are welded to the steam turbine cylinder half to minimize the effects of the high velocity turbulent conditions. After the steam turbine cylinder half is removed, the carbon steel steam turbine component is cleaned prior to welding, by methods which are well known in the art. In order to more easily and quickly perform these operations, it would be advantageous to be able to perform them while the steam turbine cylinder half is inverted, or rotated to an upside down position. While rotating the top cylinder half can be accomplished by use of the overhead crane, such operations must necessarily be performed slowly, and can require large operating spaces within the turbine building. Moreover, special cribbing equipment is needed to hold the cylinder half in place while inspection and maintenance procedures are performed thereon. A typical procedure for inverting large steam turbine cylinder halves is discussed in U.S. Pat. No. 5,031,314, which issued on Jul. 16, 1991 to Berrong et al. This patent is assigned to the assignee hereunder, and is hereby incorporated by reference herein.

It is therefore desirable to provide a quicker method of inverting steam cylinder halves. Furthermore, by providing a separate apparatus for inverting the steam turbine cylinder halves, the plant's overhead crane is freed to be used for other maintenance procedures. Thus, other procedures can be performed in parallel with the work being done on the cylinder half, thus allowing maintenance procedures to be performed in less time.

DISCLOSURE OF THE INVENTION

It is therefore an object of the present invention to provide a relatively easier method of inverting a steam turbine cylinder half for the performance of maintenance procedures.

It is another object of the present invention to provide an apparatus for inverting the steam turbine cylinder half which will also provide a work platform for repair operations.

It is a still a further object of the present invention to provide an apparatus which can be transportable such that the device can be removed from the turbine building after maintenance has been performed.

The above objects are obtained by the present invention, according to which, briefly stated, an apparatus for holding and inverting a cylinder half comprises a base member, support means associated with the base member, the support means having a jacking mechanism associated therewith. An inverting means is connected to the base member, extending upward therefrom, and includes a rotatable carriage assembly and rotational drive means therefor. The carriage assembly is adapted to be secured to the cylinder half, such as at its flange, so as to rotate the cylinder half about a predetermined axis. Preferably this axis is chosen such that the center of gravity of the cylinder half passes therethrough the axis of rotation.

A method of inverting a steam turbine cylinder half comprises the steps of removing the cylinder half from the turbine assembly and placing it upon the support platform. The jacking mechanism is then activated to raise the cylinder half thereon such that the cylinder half flange is disposed adjacent the rotatable carriage. The carriage assembly is then secured to the cylinder half. The jacking mechanism of the support platform is deactivated to lower the platform from the cylinder half, and the support platform is then removed from the base member, and the rotational drive activated to rotate the carriage assembly to thereby invert the cylinder half.

BRIEF DESCRIPTION OF THE DRAWINGS

Various other objects, features, and advantages of the invention will become more readily apparent by reading the following detailed description in conjunction with the drawings, which are shown by way of example only, wherein.

DESCRIPTION OF THE PREFERRED EMBODIMENTS

Figure 1:
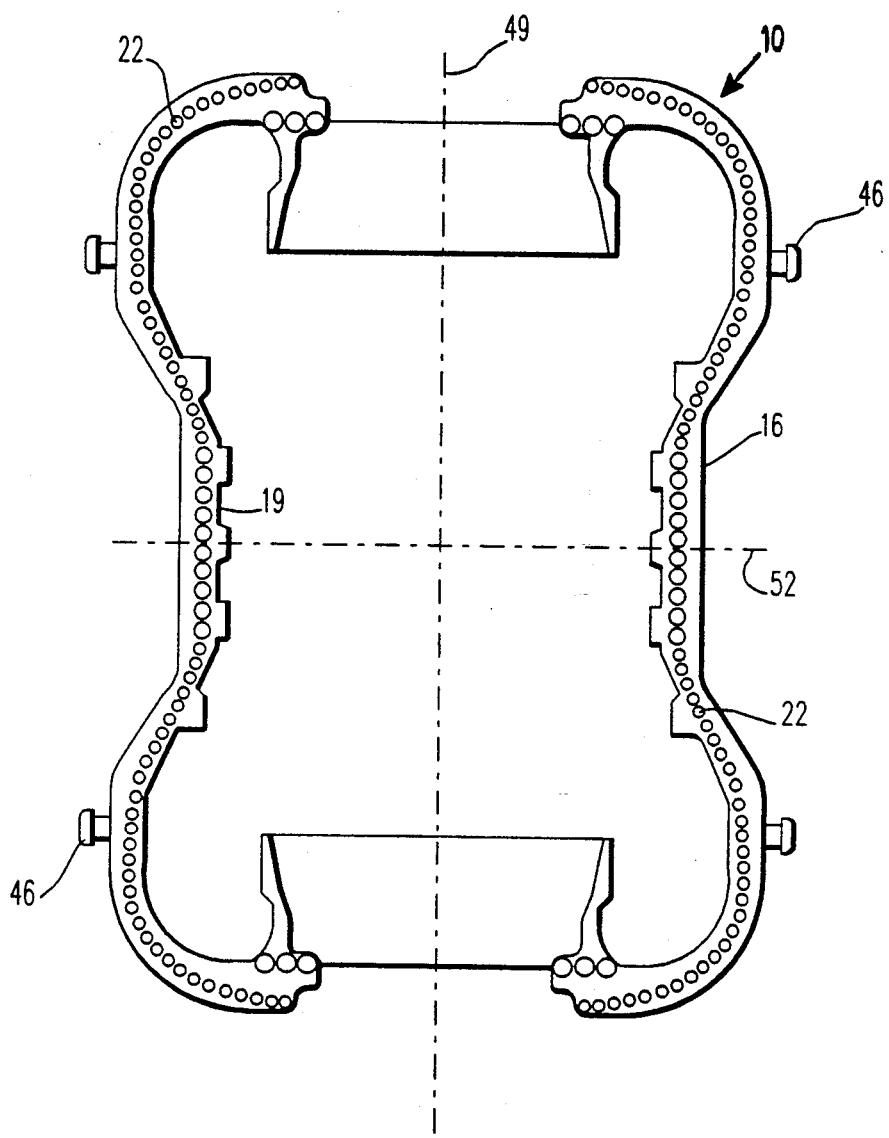
FIG. 1 is a top plan view of an exemplary steam turbine cylinder half.
Figure 2:
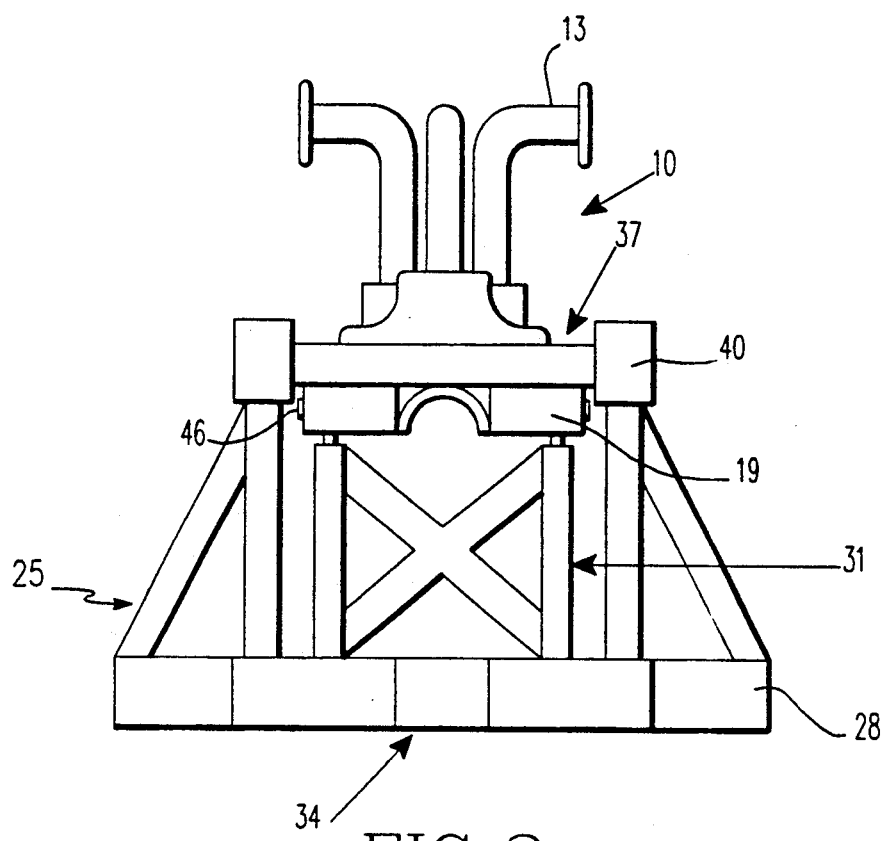
FIG. 2 shows the steam turbine cylinder half placed upon the inverting apparatus of the present invention.
Figure 3:
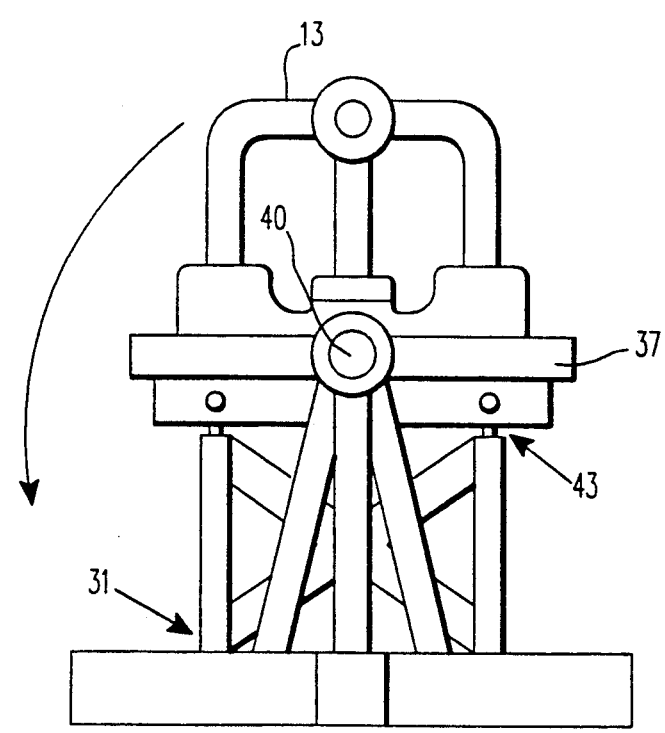
FIG. 3 is a side view taken along lines III—III of FIG. 2.
Figure 4:
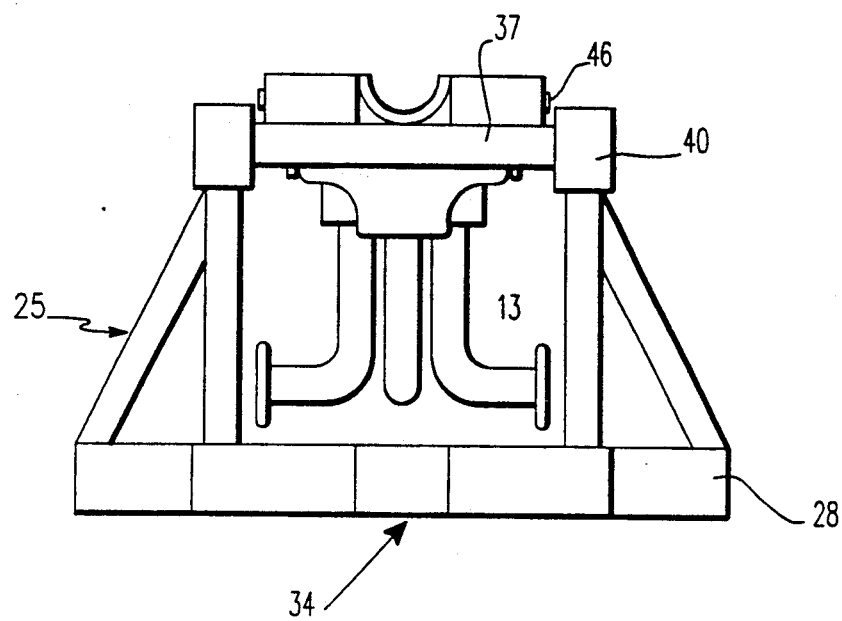
FIG. 4 shows the cylinder half in its inverted position within the inverting apparatus of the present invention.
Figure 5:
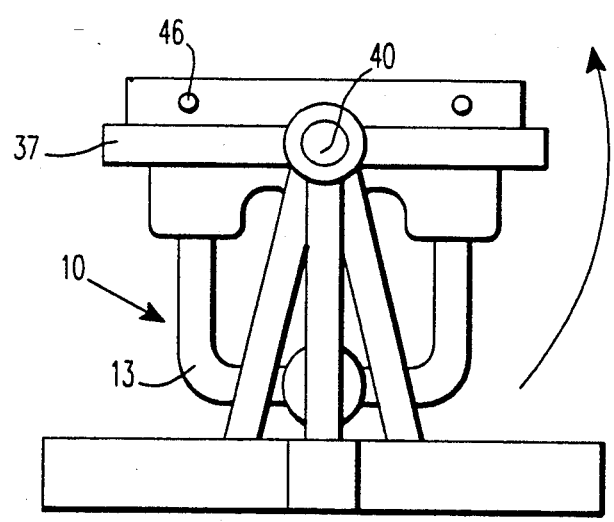
FIG. 5 is a view taken along the lines V—V of FIG. 4.

Referring now to the drawings in detail, FIG. 1 shows a typical steam turbine cylinder half 10. The cylinder half has permanently attached thereto a plurality of steam lines 13, after the cylinder half is cast by the manufacturer. A horizontal joint 16 extends around the perimeter of the cylinder half 10. Co-extensive with the joint is a wide flange 19 which includes a plurality of bolt holes 22 for securing the top cylinder half 10 to the bottom cylinder half (not shown) against internal pressure during normal operation. Generally, it is the cylinder half top flange 19 that is to be removed and inverted for maintenance and repair procedures to be performed thereon. In order to invert the cylinder half top flange so as to inspect for any erosion or steam cutting that may have occurred to the seal surface of the horizontal joint 16, a portable apparatus of the present invention is provided.

Referring now to FIGS. 2 through 5, the portable device 25 for holding and inverting steam turbine cylinder halves will be explained in greater detail. The apparatus includes an adjustable base member 28 including a support platform 31 for receiving the cylinder half 10. The device is designed to be portable in that the various pieces of the inverting device can be readily assembled and disassembled in a crane bay, or other suitable area affording adequate overhead clearance adjacent the plant's overhead crane (not shown). The base member 28 is adjustable, such as by removable section 34, to accommodate varying sizes in both length and width of steam turbine cylinder halves, which can range from a relatively small-sized cylinder half weighing approximately one hundred tons to the larger cylinder halves of a nuclear power generating station weighing two hundred tons and measuring approximately eighteen to twenty feet long. A rotatable carriage assembly 37 is supported above the base member and is adapted to be secured to the cylinder half flange 19. The carriage 37 is rotated by a rotational drive unit 40 which is controlled to rotate the cylinder half 10 at a constant rate, which will be described more fully hereinafter. The support platform 37 includes a jacking mechanism 43 to raise and lower the cylinder half flange 19 to the level of the rotatable carriage 37.

After the inverting device has been assembled, the cylinder half 10 is lowered by the overhead crane onto the temporary support platform 31, and the crane released therefrom. The load bearing carriage assembly 37 is then assembled onto the inverting device 25 in a position calculated to cause the axis of rotation to pass through the center of gravity of the final assembly. If need be, the center of gravity may be altered for this such as by counter-balancing weights being placed at predetermined positions to ensure that the center of gravity generally passes through the pivot axis of the inverting device 25. The jacks 43 on top of the support platform 31 are then actuated to raise the cylinder half 10 such that the cylinder half flange 19 opposite the horizontal joint may be fastened to the carriage assembly 37.

The cylinder half 10 can be secured to the movable carriage by utilizing the existing bolt holes 22. After the cover has been placed on the temporary support 31 as described above, long bolts would be used to pass through the holes 22 in the cylinder cover flange 19 and into the rotating carriage 37. After the cover has then been inverted and secured against axial or transverse movement while in the inverted position, the through bolts are then removed. This provides for access to the entire horizontal joint 16 area for the desired maintenance and repair activities.

An alternative method for securing the cylinder half 10 to the carriage utilizes lifting trunnions 46 which are integral feature of the cylinder half typically provided for lifting. A carriage attachment piece (not shown) made to accept the trunnions 46 locks them in place on the rotating carriage 37. After the cover has been placed on the temporary support 31 and the lifting slings from the overhead crane freed from the trunnions 46, it is then possible to attach the movable carriage to these trunnions. By utilizing the lifting trunnions 46 in this manner, access to or view of any portion of the horizontal joint 16 surface is not barred. Also, the carriage trunnion attachment may be left in place during maintenance procedures as an additional support. In both securing methods, the cylinder half is removed from the device by reversing the order of the above outlined steps.

After the flange 19 is secured to the carriage assembly 37, the jacking mechanism 43 is deactivated to lower the jacks and the temporary support platform removed. See FIGS. 4 and 5. The rotational drive unit 40 is then activated to cause the rotatable carriage assembly and the cylinder half 10 secured thereto to rotate one hundred eighty degrees (180°) to invert the cylinder half. With either of the attachment schemes discussed above, the vertical elevation of the cylinder cover, as assembled onto the carriage 37, is preferably such that the assembly is rotated about its center of gravity or very near thereto. This would allow the use of a drive assembly which is as compact as possible. Also by rotating the assembly in this manner, "flopping" action of the cylinder half 10 is avoided as the center of gravity is rotated around the axis of rotation during the turning process, and thus provides for greater safety in rotating the carriage.

As shown in the Figures, the sealing surface of the horizontal joint 16 is thus readily accessible for maintenance and repair purposes. When in the inverted position, the carriage assembly 37 is locked such that the cylinder half will not move or wobble during repair operations, such as welding. This sequence is then reversed in order to re-invert the cylinder half so that it may be lifted by the overhead crane and placed back on the cylinder bottom half of the steam turbine.

Preferably the assembly is rotated by virtue of a three-phase induction motor and mechanical drive linkage mounted on the device's frame base and driving the carriage. The motor is preferably rated at 480 volts, for typical power plant operations. The drive linkage could be any of several well known mechanisms, such as hydraulic, sprocket-and-chain drive, shaft-driven, or geared. The drive mechanism 40 is to be readily removable from the frame for ease of set-up, disassembly and/or shipment Preferably the rotational drive unit includes a deadman switch for the motor such that rotation of the carriage assembly 37 is stopped once an activating switch is released, so as to provide for a fail-safe device.

If a sprocket and chain drive linkage is utilized, the sprocket will preferably contain locking pawls on the gears such that counter-rotation of the drive motor and the carriage assembly is prevented. This would obviate any uncontrolled swinging of the cylinder half as it is inverted.

As was mentioned previously, the base member is adjustable to accommodate differing sizes of steam turbine cylinder halves. One or more removable sections 34 are provided to adjust the total width or length of the base member 28 for this purpose. The weight of the base member can also be adjusted in like manner. Additionally, the cylinder half can be secured to the carriage assembly 37 such that the axis of rotation is parallel either to the longitudinal 49 or quadrature 52 axis of the turbine cylinder. In the figures is shown a version which utilizes the quadrature axis 52 which allows for less flexure in the carriage during rotation. The design incorporates sufficient height to afford clearance for the attached steam inlet lines 13 and associated flanges while the cylinder half 10 is being rotated. The axis of rotation may be chosen based upon space limitations within a particular power plant.

By use of the present invention, cylinder half maintenance operations can be more easily performed in that personnel do not have to work with the cylinder half supported above them such that they would have to work in an overhead position. The cylinder half is rigidly held in the inverted position such that work can be performed much in the same way as is done when the cylinder half is originally manufactured. Moreover, the plant's overhead crane is freed to be used for other purposes, such that overall plant maintenance can be more easily performed to thereby lessen costly downtime of the generating station. Thus, cylinder inversion can be performed much more quickly than with previous methods, and the work to be performed thereon can be done in a more successful manner. Additionally, the cylinder half can be rotated to any position, not necessarily an inverted one, such that maintenance operations can be performed with the cylinder half at the most preferred orientation.

While specific embodiments of the invention have been described in detail, it will be appreciated by those skilled in the art that various modifications and alterations would be developed in light of the overall teachings of the disclosure. Accordingly, the particular arrangements disclosed are meant to be illustrative only and not limiting as to the scope of the invention which is to be given the full breadth of the appended claims and in any and all equivalents thereof.

What is claimed is:

1. A method of inverting a steam turbine cylinder half having a flange thereon, said method comprising the steps of:
   a. providing an inverting apparatus comprising a base member, a removable support platform associated with the base member and having a jacking mechanism, and inverting means extending upward from the base member and having a rotatable carriage assembly adapted to be secured to the cylinder half flange;
   b. placing the cylinder half upon the support platform;
   c. activating the jacking mechanism of the support platform to position the cylinder half thereon such that the cylinder half flange is disposed adjacent said inverting means;
   d. securing the cylinder half flange to said inverting means;
   e. deactivating the jacking mechanism and removing the support platform from the base member; and
   f. actuating said inverting means to rotate the carriage assembly and the cylinder half thereon a predetermined amount.

2. The method as recited in claim 1, wherein step f comprises actuating said inverting means to rotate the cylinder half about an axis which passes through its center of gravity.

3. The method as recited in claim 2, wherein step f further comprises actuating said inverting means such that the cylinder half is rotated at a substantially constant rate.

4. The method as recited in claim 3, wherein the step of actuating said inverting means comprises rotating the cylinder half about one hundred eighty degrees (180°).

5. The method as recited in claim 1, wherein step f comprises actuating said inverting means to rotate the cylinder half about an axis which passes through its quadrature axis.

6. The method as recited in claim 5, wherein the step of actuating said inverting means comprises rotating the cylinder half about one hundred eighty degrees (180°).

* * * * *